J. S. REED.
Improvement in Stuffing-Boxes for Piston-Rods, &c.
No. 128,906. Patented July 9, 1872.
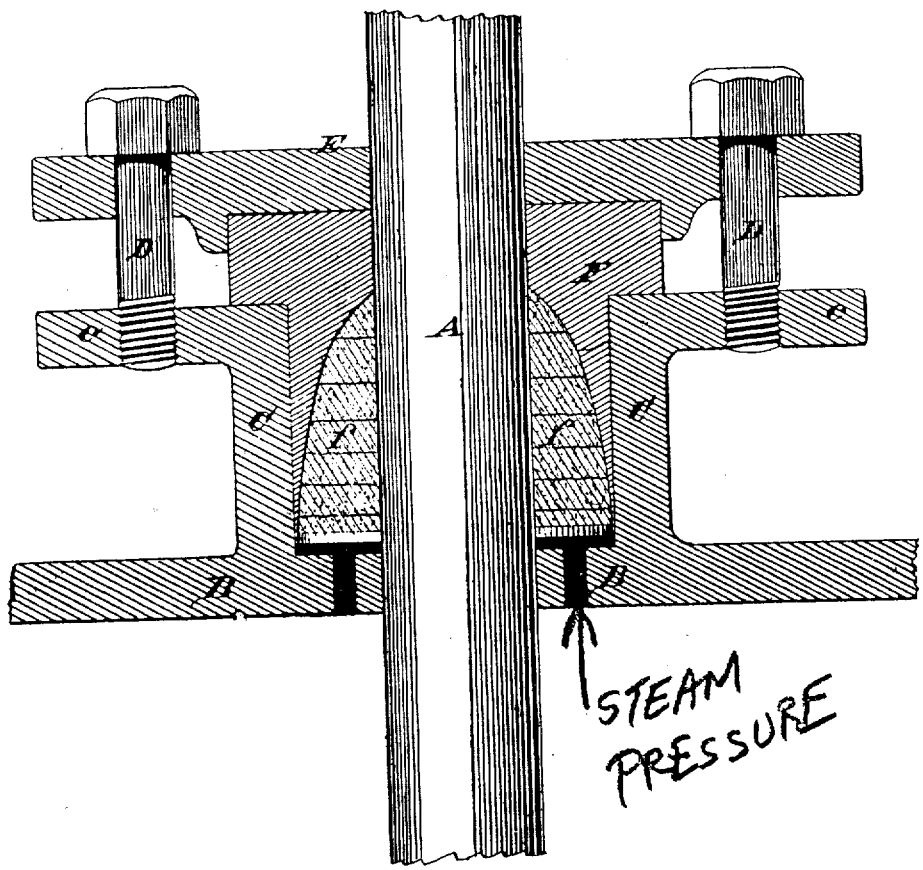
Scale Full Size.
ATTEST,
Jas. L. Ewin
Walter Allen
INVENTOR,
John S. Reed
By Knight Bros. Attys.

128,906

UNITED STATES PATENT OFFICE.

JOHN S. REED, OF ST. LOUIS, MISSOURI.

IMPROVEMENT IN STUFFING-BOXES FOR PISTON-RODS, &c.

Specification forming part of Letters Patent No. 128,906, dated July 9, 1872.

Specification describing a certain Improvement in Stuffing-Boxes, invented by JOHN S. REED, of the city and county of St. Louis and State of Missouri.

My invention relates to the construction of the stuffing-boxes of steam, air, or water engines, blowers, meters, &c.; and consists in making the packing-chamber of outwardly-decreasing diameter, (as shown,) so that the pressure from the interior of the cylinder, &c., will force the packing outward toward the contracted part of the stuffing-box and against the rod or shaft.

The drawing is an axial section of my improvement applied to a common reciprocating steam-engine.

A is a part of the piston rod, and B of the cylinder-head. C is an ordinary stuffing-box, into whose flange $c$ screw the bolts or stud-bolts D. E is a cap held down by the bolts D, and retaining the bush or box F, which is made to snugly fit the interior of the box C, and has an inside cavity, $f$, of conical or cup-like form, constituting the packing-chamber. The exact form of the packing-chamber is not material, so that its diameter is larger toward the side of greater pressure, which will cause the steam, &c., to force the packing upward toward the contracted part of the chamber to tightly embrace the piston-rod.

My improvement is applicable alike to steam, air, or water engines, and to blowers and meters, and in almost any position where a stuffing-box is required for a piston-rod or shaft.

I have shown my improvement as applied to a stuffing-box of ordinary construction; but it is evident that the arrangement admits of modification without in any way changing the principle of operation brought into action by my improvement. For instance, the lower end of the box or bush F may be made to fit tightly on the cylinder-head by means of a gasket or ground-joint, and the box C may be dispensed with.

The operation of my box is as follows: When the working steam, air, &c., is above the piston, (that is, between the piston and stuffing-box,) it (the steam, &c.) enters the stuffing-box beneath the packing and forces the latter upward, preventing any leakage between the piston and packing; but when the steam is in the chamber (of the cylinder) beneath the piston, the packing is relieved from steam-pressure, and the rod from friction in the stuffing-box, caused by said pressure.

I claim—

The combination of the gland F having an inside cavity, $f$, of a conical or cup-like form, with stuffing-box C, follower E, and packing, constructed and operated as set forth.

JOHN S. REED.

Witnesses:
SAML. KNIGHT,
J. E. RUSSELL.